US006718853B2

(12) United States Patent
Butterworth

(10) Patent No.: US 6,718,853 B2
(45) Date of Patent: Apr. 13, 2004

(54) LOG SAW APPARATUS AND METHOD

(75) Inventor: Tad T. Butterworth, Ashland, WI (US)

(73) Assignee: C. G. Bretting Manufacturing Co., Inc., Ashland, WI (US)

( * ) Notice: Subject to any disclaimer, the term of this patent is extended or adjusted under 35 U.S.C. 154(b) by 0 days.

(21) Appl. No.: 10/131,372

(22) Filed: Apr. 24, 2002

(65) Prior Publication Data

US 2003/0200845 A1 Oct. 30, 2003

(51) Int. Cl.$^{7}$ .............................. B23B 3/04; B23B 5/14
(52) U.S. Cl. ................................................ 82/91; 82/83
(58) Field of Search ............................ 82/42, 53, 53.1, 82/70.2, 88, 89, 90, 91, 101

(56) References Cited

U.S. PATENT DOCUMENTS 460,317 A * 9/1891 Whitney ........................ 82/89
811,593 A * 2/1906 Stout ............................. 82/86
1,042,998 A * 10/1912 Blackmore ..................... 82/79
1,242,448 A * 10/1917 Judelshon ...................... 82/49
1,984,730 A * 12/1934 Darling .......................... 82/91
4,487,378 A * 12/1984 Kobayashi ............... 242/160.1
5,271,137 A 12/1993 Schutz
5,453,070 A 9/1995 Moody
5,755,146 A 5/1998 Lumberg

* cited by examiner

*Primary Examiner*—A. L. Wellington
*Assistant Examiner*—Brian D. Walsh
(74) *Attorney, Agent, or Firm*—Michael Best & Friedrich LLP

(57) ABSTRACT

Some preferred embodiments of the present invention includes an apparatus and method employed for cutting a rotating log of rolled product into rolls, the apparatus and method utilized for preventing collapse of a longitudinally extending aperture in the log during the cutting process. The present invention includes a mandrel received within the aperture of the log to at least partially support the log and to preferably maintain the integrity of the aperture while the log is being cut by a saw blade. Preferably, the mandrel has at least one recess within which a saw blade can be received during cutting operations upon the log.

28 Claims, 11 Drawing Sheets

LOG SAW APPARATUS AND METHOD

FIELD OF THE INVENTION

The present invention relates to saw assemblies for wound products, and more particularly to saw assemblies having mandrels for at least partially supporting the wound products while they are being cut by a log saw.

BACKGROUND OF THE INVENTION

Rolled products, such as bathroom tissue, paper toweling, wax paper, foil, plastic sheeting, fabric, or other material found in sheet form are typically produced in two ways. The rolled products are produced either with a core at the center of the roll or without a core at the center of the roll. Due to cost and manufacturing limitations associated with the use of a core, it has become advantageous to produce coreless rolled products. However, to allow a coreless product to be used with existing dispensers designed for cored rolled products, it is typically necessary to include a longitudinally extending aperture through the coreless rolled product.

Coreless rolled products are typically produced on winding mandrels to create the central aperture that extends along the longitudinal axis of the rolled product. The winding mandrel forms a relatively long log of rolled product that is later cut into usable lengths or rolls by a saw blade. A disadvantage of coreless rolled products is that the center aperture has the tendency to collapse when the log is being cut into rolls by the saw blade. Even in rolled products having a core, the amount of force exerted upon the rolled product during some cutting operations can cause the core to deform or collapse if not at least partially supported by a mandrel. For example, some rolled products can be easily deformable or can require larger cutting forces capable of bending, deforming, crushing, or otherwise damaging the rolled product if not supported by a mandrel. Additional design limitations arise due to the conventional practice of cutting logs with a saw that must pass through a length equal to the diameter of the log in order to completely cut the log. A blade that must pass this deeply into the log can often generate significant friction, heat, and undesirable forces during cutting operations, and can result in poor cuts and poor product quality.

Different methods have been developed to alleviate this problem in rolled products with or without cores. For example, tightening the wind of the coreless rolled product can increase the stiffness and rigidity of the rolled product, thereby reducing the amount of aperture collapse. Although this solution can reduce collapse, it can also increase the friction between the saw blade and the log, thereby increasing the difficulty of cutting the log into rolls and calling for larger cutting forces.

In combination with or as an alternative to tightening the wind of a rolled product, some saw assemblies include a mandrel that is received within the aperture of the log to maintain the shape of the aperture during the cutting process and to reduce the amount of aperture collapse. Some saw assemblies, such as the one disclosed in U.S. Pat. No. 5,271,137, include a mandrel positioned entirely on one side of the saw blade during cutting operations upon the log. The mandrel includes an end that is positioned adjacent to the saw blade to support the aperture when the saw blade moves through the log to cut a roll from the log. Other saw assemblies, such as the one disclosed in U.S. Pat. No. 5,453,070, include a first mandrel positioned on one side of the saw blade and a second mandrel positioned on the opposite side of the saw blade. Each mandrel includes an end positioned adjacent to the saw blade to support the aperture when the saw blade moves through the log between the ends of the mandrels. Although it is the intention of these saw assemblies to support the aperture close to the saw blade during the cut, these saw assemblies still allow a substantial amount of aperture collapse that can result in a poor quality cut. In addition, the use of two mandrels (and associated elements and equipment) adds significant cost to log cutting machinery.

In light of the above design requirements and limitations, a need exists for a saw assembly that includes a mandrel which provides superior support of the center aperture of a log during the cutting process, reduces the collapse of the aperture during the cutting process, and allows for the rotation of the logs during the cutting process so the saw blade cuts a roll from the log after passing through less than the diameter of the rotating log, thereby lowering the force and friction applied to the log by the saw blade. Each of the preferred embodiments of the present invention achieves one or more of these results.

SUMMARY OF THE INVENTION

In some preferred embodiments of the present invention, an apparatus and method are employed for cutting a rotating log into rolls utilized for preventing or reducing the collapse of a longitudinally extending aperture in the log during the cutting process. Some embodiments of the present invention preferably include a mandrel received within the aperture of the log to at least partially support the log and maintain the integrity of the aperture while the log is being cut by a saw blade. The mandrel can include a longitudinal axis, a first portion, and a second portion along the longitudinal axis. The first portion preferably includes a radially outermost surface defining a first radial distance from the longitudinal axis, and the second portion preferably includes a radially outermost surface defining a second radial distance from the longitudinal axis which can be the same or different from the first radial distance.

Preferably, the saw blade is movable toward the longitudinal axis to a cutting position between the first portion and the second portion. At the cutting position, the mandrel preferably has a third distance between the saw blade and the longitudinal axis, the third distance being shorter than at least one of the first and second radial distances to thereby locate the saw beneath the surfaces of the first and second portions. By positioning the saw blade beneath the surfaces of the first and second portions and by rotating the log, the saw blade is capable of cutting a roll from the log after moving partially through the log. Preferably, the outer surfaces of at least one of the first and second portions maintain the shape of the aperture adjacent to the saw blade during the cutting process. More preferably, the outer surfaces of both the first and second portions maintain the shape of the aperture adjacent to the saw blade during the cutting process.

In some preferred embodiments of the invention, the mandrel is rotatable with the log and includes a third portion connecting the first and second portions. Preferably, the third portion includes an radially outermost surface defining the third radial distance from the longitudinal axis. The saw blade is or can preferably be aligned with the third portion and is movable to the cutting position such that the saw blade is positioned beneath the surfaces of the first and second portions and avoids contact with the third portion as the mandrel rotates with the log. The third portion is preferably a recess that extends around a circumference of the mandrel. In some embodiments, the recess non-abruptly transitions into the first and second portions, such as by having sidewalls that join with the surfaces of the first and second portions at a non-orthogonal angle, by a radiused transitional surface between the sidewalls and the surfaces of the first and second portions, and the like. The transition can preferably reform any partial collapse of the aperture as the log and roll move axially to reposition the log for the next cut or to remove the roll or log from the mandrel. Although a mandrel having a recess extending about the circumference of the mandrel can be rotatable with the log as just described, the mandrel can instead be secured against rotation in cases of logs that can be rotated with respect to the mandrel during cutting operations.

In other preferred embodiments of the invention, the mandrel is secured against rotation, includes a third portion connecting the first and second portions and defining a recess that opens toward the saw blade and that only extends partially around a circumference of the mandrel. The recess can be deeper or shallower than the radius of either or both the first and second portions (i.e., deeper or shallower than the length of the first and/or second radial distances). The saw blade is or can preferably be aligned with the third portion and movable to the cutting position so the saw blade is positioned beneath the surfaces of the first and second portions and does not contact the third portion of the non-rotating mandrel. As with mandrels having a recess extending fully around the mandrel as described above, the third portion preferably non-abruptly transitions into the first and second portions. In addition, the recess preferably non-abruptly transitions into an outermost surface of the third portion joining the first and second portions. The transition can preferably reform any partial collapse of the aperture as the log and roll rotate around the third portion of the mandrel.

More preferably, the third portion is secured against rotation in this embodiment while the first portion is rotatable with the log relative to the third portion. For example, the third portion can be located on a shaft while the first portion can be a sleeve rotatably coupled to the shaft. More preferably, the second portion can also be rotatable and can be an additional sleeve rotatably coupled to the shaft on a side of the third portion opposite the first sleeve.

In other preferred embodiments of the invention, the mandrel includes two or more recesses each having a depth at a corresponding radial distance from the longitudinal axis. Preferably, the mandrel is axially movable to align the blade with the different recesses. Alternatively or in addition, the blade (or saw) can be movable to align the different recesses with the blade. The saw blade is preferably moveable toward the longitudinal axis to a cutting position within any of the recesses. Each cutting position defines a radial position which is preferably shorter than at least one of the first and second radial distances. Preferably, by positioning the saw blade beneath the surfaces of the first and/or second portions in one of the aligned positions and by rotating the log, the saw blade is capable of cutting a roll from the log after moving partially through the log. Also preferably, by axially moving the mandrel to align the saw blade in another position, further cuts can be made in the log in a similar manner.

Other features and advantages of the invention will become apparent to those skilled in the art upon review of the following detailed description, claims, and drawings.

Figure 1:
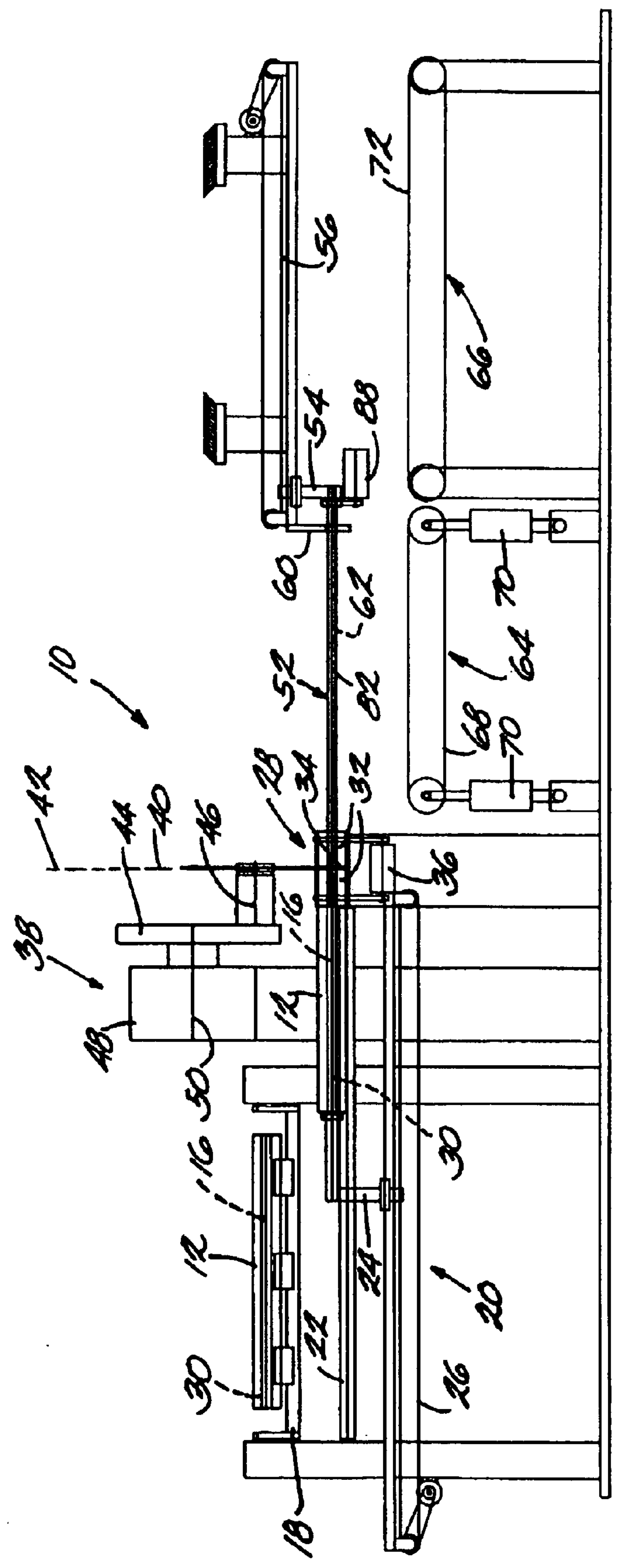
FIG. 1 is an elevational side view of the saw assembly according to a preferred embodiment of the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a saw assembly 10 embodying features of the present invention for cutting a log 12 of rolled product into rolls 14 (e.g., rolls sized for consumer use). The log 12 includes a centrally located, longitudinally extending aperture 16. The saw assembly 10 can include any assembly or mechanism for transporting logs of wound material to the log saw 38. Such assemblies or mechanisms can include one or more conveyors, carriages, ramps, and the like. In the illustrated preferred embodiment for example, the saw assembly 10 includes a log bucket 18 that feeds the log 12 onto a log indexing conveyor 20 leading to the log saw 38. The log indexing conveyor can take any form desired, such as one or more belt, chain, tabletop or other types of conveyors. In the illustrated preferred embodiment of FIG. 1, the log indexing conveyor 20 includes a log trough 22 that supports the log 12, although any other shape and arrangement of the conveyor 20 can instead be employed as desired. The conveyor 20 preferably includes a pusher 24 that moves to push the log 12 toward the log saw 38. The pusher 24 can operate alone to push the log 12 toward the log saw 38 or can work in conjunction with one or more belts, chains, or other conveying elements of the conveyor 20 to perform this function. The pusher 24 (if used) can have a plate, plug, bar, or other element movable to contact and push the log 12 as just described, and can be movable in any conventional manner such as by attachment to a carriage on a rail or track, to a rack and pinion assembly, to a hydraulic or pneumatic cylinder, and the like.

The saw assembly 10 also preferably includes a rotating clamp assembly 28 that receives the log 12 from the pusher 24 (or other log conveyor) and clamps and rotates the log 12 about a longitudinal axis 30 of the log 12. The illustrated clamp assembly 28 includes two rotating clamps 32 positioned in an end-to-end relationship and defining a gap 34 between the clamps 32. Alternatively, the log can be rotated by a single clamp 32 located on one side of the log saw blade 40. In those embodiments having two clamps 32, the clamps 32 are preferably rotated in tandem by a motor 36 and selectively adjusted to vary the clamping pressure against the log 12. An example of one such rotating clamp assembly 28 is shown and described in U.S. Pat. No. 5,755,146 which is commonly owned by the assignee of this application. Alternatively, each clamp can be driven be a respective motor as desired, and can provide limited or no clamp pressure adjustability. Although the use of a rotating clamp assembly 28 is preferred, other embodiment employ a clamp assembly that does not rotate, or can instead employ no clamp assembly at all (in which case the rolled product upon the mandrel can be rotated by rotation of the mandrel, by one or more rollers in contact with the rolled product, or in any other manner desired).

Figure 4:
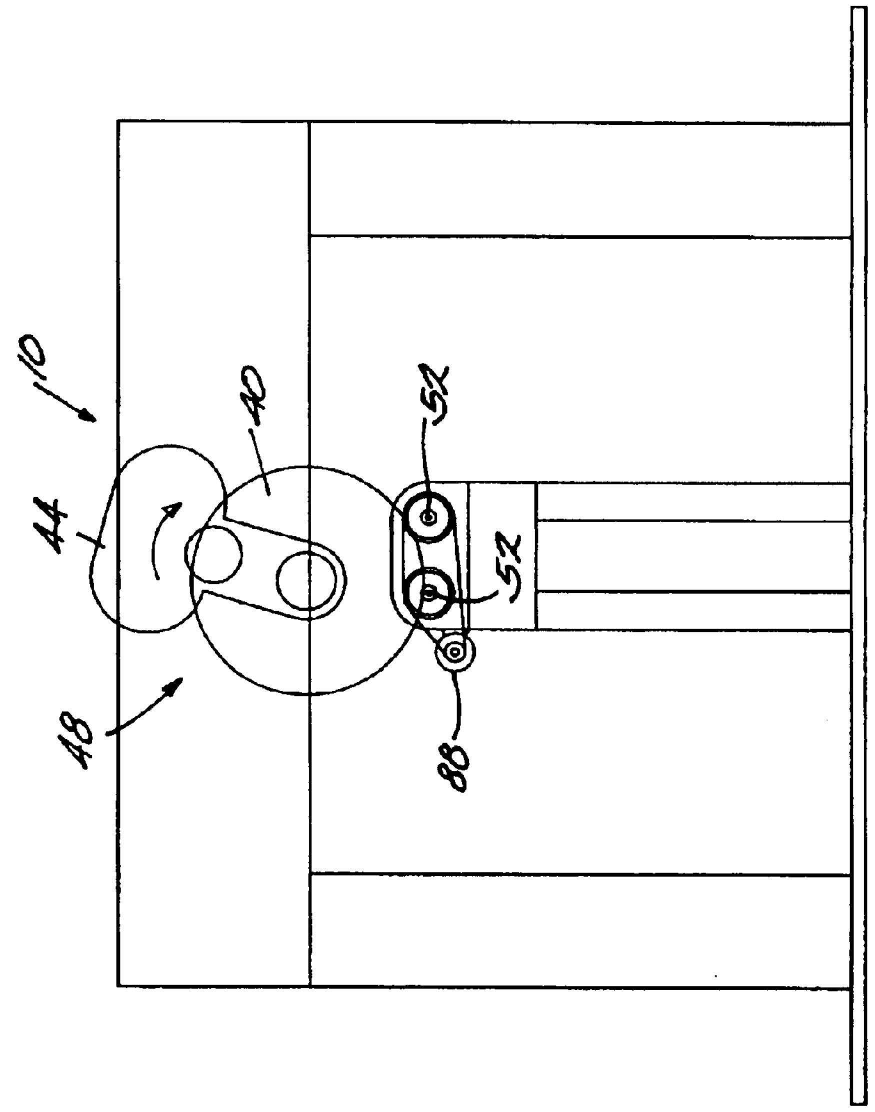
FIG. 4 is an elevational end view of the saw assembly shown in FIG. 1.

The saw assembly 10 includes a saw 38 including a saw blade 40 that defines a plane 42 preferably aligned with the gap 34 between the clamps 32 and that is preferably coupled to an orbital head 44 for rotation about a saw blade axis 46. Preferably, the orbital head 44 is coupled to a saw base 48 for rotation about a head axis 50. The saw blade 40 and orbital head 44 are preferably independently driven for rotation by motors (not shown) located within the saw base 48 or otherwise drivably connected to the orbital head. Preferably, the saw blade axis 46 is moved by the orbital head 44 such that the saw blade 40 moves along an arcuate path. By rotating the orbital head 44, the saw blade 40 translates from a position radially outside of the clamps 32 to a position within the gap 34 between the clamps 32. In addition, the arcuate motion of the saw blade 40 allows the saw blade 40 to cut multiple logs 12 positioned side by side in different lanes as shown by way of example in FIG. 4. Although any number of lanes can be utilized with the present invention to increase productivity, the preferred embodiment illustrated in FIGS. 1 and 5–11 will be described as a single lane device. Also, in other embodiments of the present invention, different types of saws and cutting devices can be employed as alternatives to the orbital saw of the illustrated preferred embodiment. Such alternative saws and cutting devices include without limitation band saws, wire saws, non-orbital rotating blades, reciprocating blades, and the like, all of which are understood to fall within the terms "saw" and "blade" as referred to herein and in the appended claims.

The saw assembly 10 also includes a mandrel 52 preferably having a first end cantilever mounted to a mandrel support bracket 54. The mandrel support bracket 54 is preferably coupled to a mandrel conveyor 56 to move the mandrel 52 in a longitudinal direction. Alternatively, the mandrel 52 could be moved longitudinally by any other device known to those skilled in the art for providing linear or substantially linear motion, such as a hydraulic or pneumatic cylinder, a worm or screw drive, a motor driving the mandrel 52 via any conventional power transmission elements or devices, a rack and pinion assembly, a carriage mounted upon a rail or track and to which the mandrel 52 is connected, or other such device. Preferably, the conveyor 56 moves the mandrel 52 toward and away from the clamp assembly 28. More preferably, the mandrel 52 moves between a position where a recess 58 in the mandrel 52 is located within the clamp assembly 28 and another position where the entire mandrel 52 is outside of the rotating clamp assembly 28 and partially or fully beyond a fixed stripping element 60.

The stripping element 60 can be a plate, bar, rod, or other element or structure adjacent to the mandrel 52 to strip product (e.g., rolls cut from the log 12) from the mandrel 52 as the mandrel 52 is moved with respect thereto. In the illustrated preferred embodiment for example, the stripping element is a plate 60. In other embodiments, the stripping plate or other stripping element 60 can be movable to perform the mandrel stripping process, such as by being connected to any of the elements and structures described above with reference to longitudinal movement of the mandrel 52.

As mentioned above, the mandrel 52 preferably has a recess 58. This recess 58 is preferably located at a position between the ends of the mandrel 52. As used herein and in the appended claims, the term "recess" is not limited to any particular configuration of notch, cutout, void or cavity within the mandrel 52. Specifically, the recess 58 can be produced in any manner (e.g., machining, casting, forming, molding, and the like) and can take any form that allows the saw blade 40 to move past the outermost surfaces of the portions of the mandrel 52 flanking the recess 58 such that the saw blade 40 can move within the recess 58 to a position that is radially closer to a longitudinal axis 62 of the mandrel 52 than the outermost surfaces of the portions of the mandrel 52 flanking the recess 58. It should also be noted that the saw blade 40 in this position is also referred to throughout the specification and claims herein as being "beneath" one or more surfaces of the mandrel 52, although the term "beneath" only refers to the relationship of the saw blade 40 to the mandrel surface(s) and does not indicate or imply an orientation of the mandrel 52, saw 38, or other part of the saw assembly 10 with respect to the surrounding environment.

Although some preferred embodiments (such as the illustrated preferred embodiment) employ a mandrel 52 having a round cross-sectional shape, the mandrel 52 can instead be any shape and configuration permitting the mandrel 52 to be positionable within the aperture 16 of the log 12 or roll 14 to assist in maintaining the integrity of the aperture 16. For example, the cross-section of the mandrel 52 could be triangular-shaped, rectangular shaped, star-shaped, or could have any other shape which provides a contact surface that would at least partially support the log 12 or roll 14 when the mandrel 52 is positioned inside of the aperture 16. Further, as used throughout the specification and the claims, a "radius" or a "radial distance" is used to identify the distance from the longitudinal axis 62 of the mandrel 52 to any other point at the same or substantially the same longitudinal position along the mandrel 52, whether or not the cross-sectional shape of the mandrel 52 is round. For example, if the mandrel 52 includes a triangular cross-sectional shape, then the distance between the longitudinal axis 62 and a point defined by one of the apexes of the triangle can be referred to as a radius or a radial distance. Similarly, the distance between the longitudinal axis 62 and a point of the triangle between two apexes of the triangle is also referred to as a radius or radial distance.

Although in the illustrated preferred embodiment the outer periphery of the mandrel 52 preferably has a constant or substantially constant cross-sectional shape between the ends of the mandrel 52, it should be noted that a non-constant cross-sectional shape is also within the scope of the present invention. For example, the mandrel 52 can taper in one or more directions at any point along the length of the mandrel 52, can taper intermittently, can have a stepped outer surface along any portion of the mandrel 52, can have an outer periphery that expands and contracts along the length of the mandrel 52, or can have any other non-constant longitudinal shape desired.

In some embodiments of the present invention, the saw assembly 10 also includes one or more conveyors positioned or positionable to carry product (e.g., cut product rolls, uncut portions of the log 12, and the like) away from the saw 38. Such a conveyor or conveyors can by of any type, including those described above with reference to the log indexing conveyor 20. Also, in some embodiments one or more of such conveyors can be moved to and from a position to receive product from the mandrel 52. By way of example only, the illustrated preferred embodiment shown in FIG. 1 has a movable conveyor 64 and a product discharge conveyor 66 positioned side by side with each other. The movable conveyor 64 preferably includes a rotatable belt 68 which is coupled to actuators 70 that move the belt 68 toward and away from the mandrel 52. Any other conventional system or device can instead be employed to move the rotatable belt 68 toward and away from the mandrel 52. The product discharge conveyor 66 preferably includes a rotating belt 72 positioned to receive product from the movable conveyor 64 and to convey the product out of the saw assembly 10.

Figure 2:
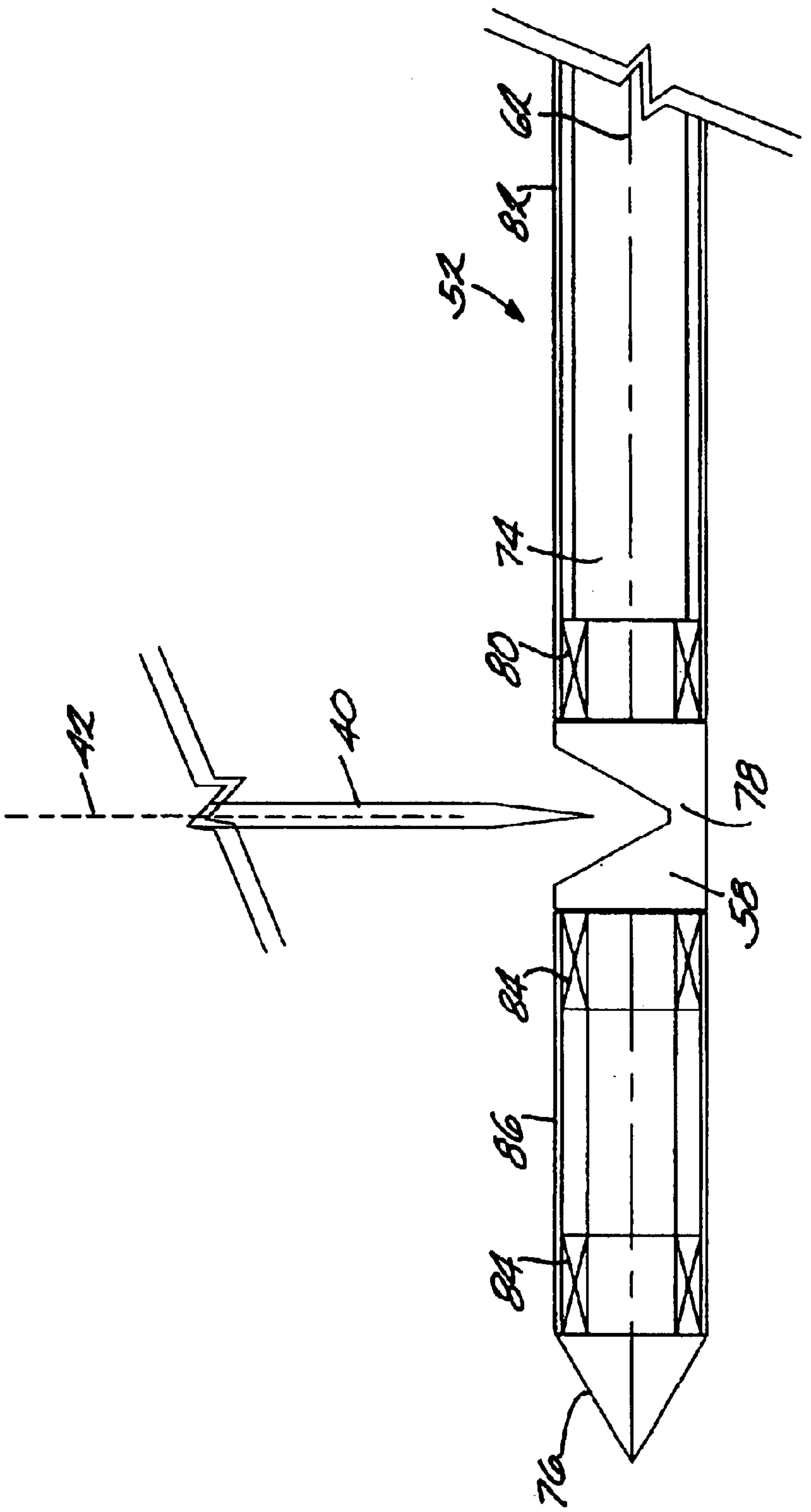
FIG. 2 is an enlarged side view of a mandrel according to a preferred embodiment of the present invention.

FIG. 2 illustrates the mandrel 52 according to one preferred embodiment of the invention. The mandrel 52 includes a central shaft 74 that is preferably mounted at one end to the mandrel support bracket 54 and that is secured against rotation. The central shaft 74 can be solid or hollow, and preferably includes a pointed tip 76 at the distal end and a non-rotating portion 78 between the ends of the mandrel 52 including the recess 58. The pointed tip 76 can assist in proper mating of the mandrel 52 with a log 12 as mentioned above, although other tip shapes can also be employed to perform this function, such as bull-nosed or rounded tip shapes. In still other embodiments, the end of the mandrel has no tapered or rounded tip.

In order to enable product on the mandrel 52 to rotate with respect to the mandrel 52 during cutting operations upon the log 12, bearings 80 are preferably coupled to the central shaft 74 on one side of the non-rotating portion 78 to rotatably support a main sleeve 82 over the central shaft 74. Preferably, other bearings 84 are also coupled to the central shaft 74 on the other side of the non-rotating portion 78 opposite the main sleeve 82 to rotatably support an additional sleeve 86 over the shaft 74 between the bearings 84. The bearings 80, 84 can be of any conventional form, such as thrust bearings, ball bearings, roller bearings, journal bearings, and the like. Although bearings 80, 84 and sleeves 82, 86 are preferably employed on both sides of the recess 58, in some embodiments a bearing 80, 84 and/or sleeve is located only on one side of the recess 58. In other embodiments (such as those in which the log 12 and mandrel 52 have a clearance fit), no bearings are employed upon the mandrel 52. Instead, the log 12 contacts and is rotatable about the stationary shaft 74 or is received upon sleeves 82, 86 which have a sufficiently clear fit to rotate upon the stationary shaft 74.

With reference again to the embodiment of the mandrel 52 illustrated in FIG. 2, the radii of the radially outermost surfaces of the sleeves 82, 86 and the radius of the radially outermost portion of the non-rotating portion 78 are preferably substantially equal, although differences in the radii are possible in some embodiments. With reference to FIG. 1, the saw assembly 10 preferably includes a motor 88 that rotates the main sleeve 82 about the central shaft 74 to rotate with the log 12 during the cutting process. As shown in FIG. 2, the recess 58 extends only partially around the mandrel 52, leaving a side of the non-rotating portion 78 unrecessed. Preferably, the recess 58 of the non-rotating portion 78 circumferentially transitions in a non-abrupt manner into the unrecessed part of the non-rotating portion 78. Also, the recess 58 preferably non-abruptly transitions into the sections of the non-rotating portion 78 flanking the recess 58 along the longitudinal axis 62. The non-abrupt transitions of the non-rotating portion can be defined in a number of different manners, such as surfaces of the recess that are at an acute angle with respect to the recess 58 as shown in FIG. 2, can be defined by curved or bowed walls of the recess 58, and the like.

Figure 3:
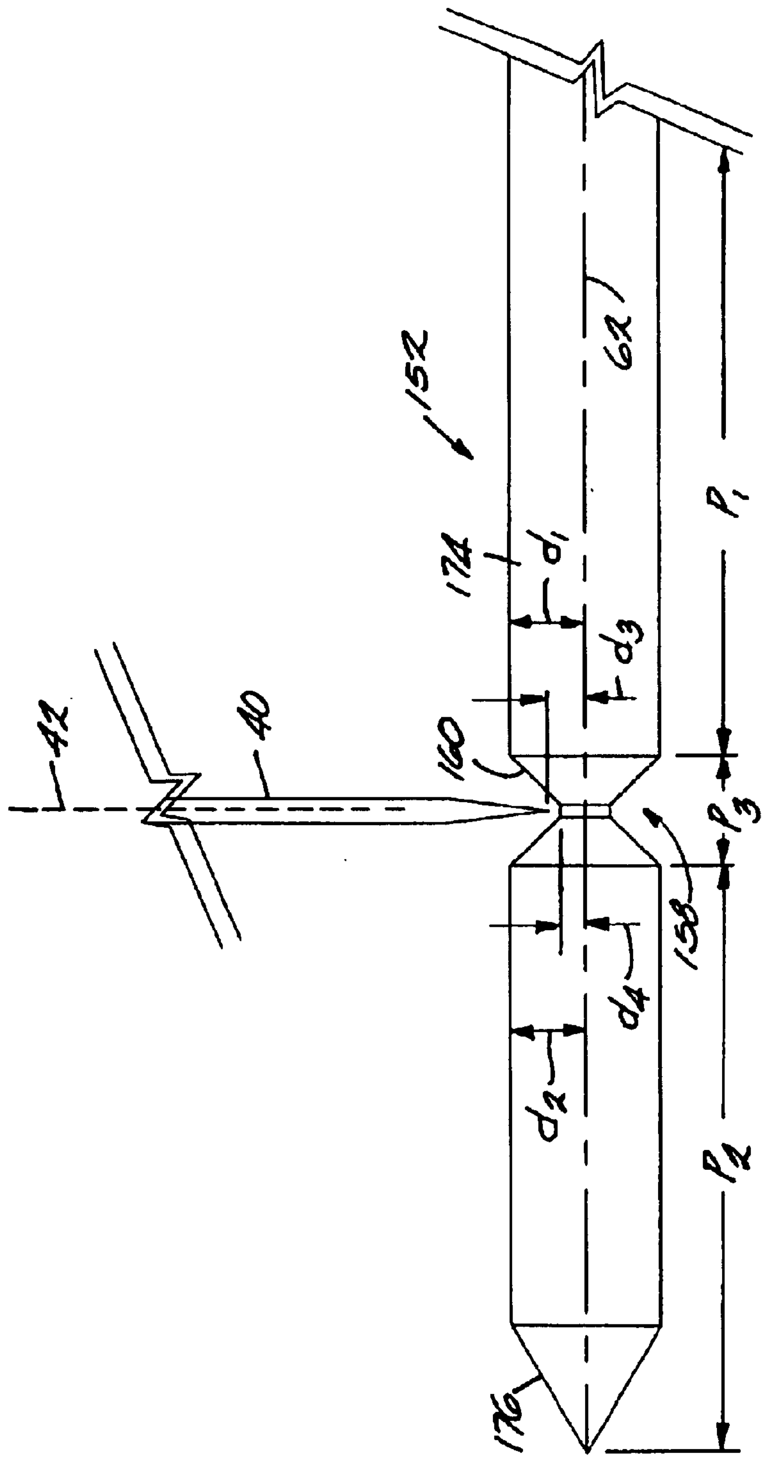
FIG. 3 is an enlarged side view of a mandrel according to another preferred embodiment of the present invention.

The present invention is not limited to the preferred mandrel 52 described above and illustrated in FIG. 2. For example, and as described in greater detail above, the mandrel 52 could be entirely secured from rotation so that the recess 58 would always face the saw blade 40 and the log 12 and cut rolls 14 would slidably contact the mandrel during rotation and translation of the log 12 and rolls 14 relative to the mandrel 52. In other embodiments, the entire mandrel rotates such as the embodiment illustrated in FIG. 3. With reference to FIG. 3, the mandrel 152 includes a shaft 174 that is mounted at one end to the mandrel support bracket 54. The mandrel 152 includes a pointed tip 176 at the distal end of the mandrel 152 to aid in positioning the mandrel 152 within the aperture 16 of the log 12, although other mandrel end shapes can be employed as described in greater detail above. The mandrel 152 includes a recess 158 that extends entirely around the mandrel 152. Preferably, the recess 158 non-abruptly transitions into the first and second portions $P_1$, $P_2$ of the mandrel 152 flanking the recess 158, which defines a third portion $P_3$. Also shown in FIG. 3, the first portion $P_1$ includes a radially outermost surface defining a first radial distance $d_1$ from the longitudinal axis 62, the second portion $P_2$ includes a radially outermost surface defining a second radial distance $d_2$ from the longitudinal axis 62, the saw blade 40 (illustrated in the cutting position) defines a third radial distance $d_3$ between the saw blade 40 and the longitudinal axis 62, and the third portion $P_3$ includes a radially innermost surface defining a fourth radial distance $d_4$ from the longitudinal axis 62.

Figure 5:
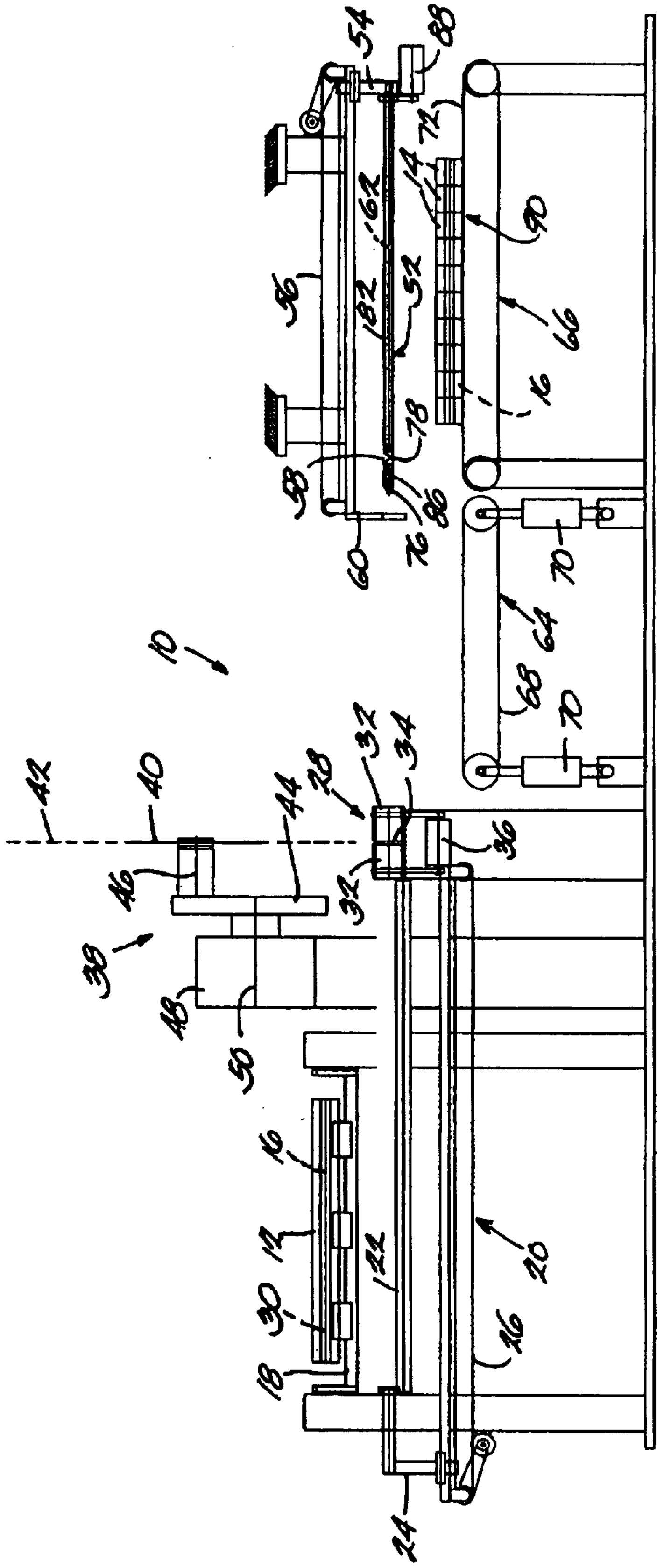
FIGS. 5–11 are elevational side views of the saw assembly shown in FIG. 1, illustrating the progression of a saw blade and a mandrel of the saw assembly shown in FIG. 1.

The operation of a preferred embodiment of the saw assembly according to the present invention is described with reference to FIGS. 5–11. As shown in FIG. 5, the log 12 is shown in the log bucket 18 ready to be loaded into the log indexing conveyor 20.

Figure 6:
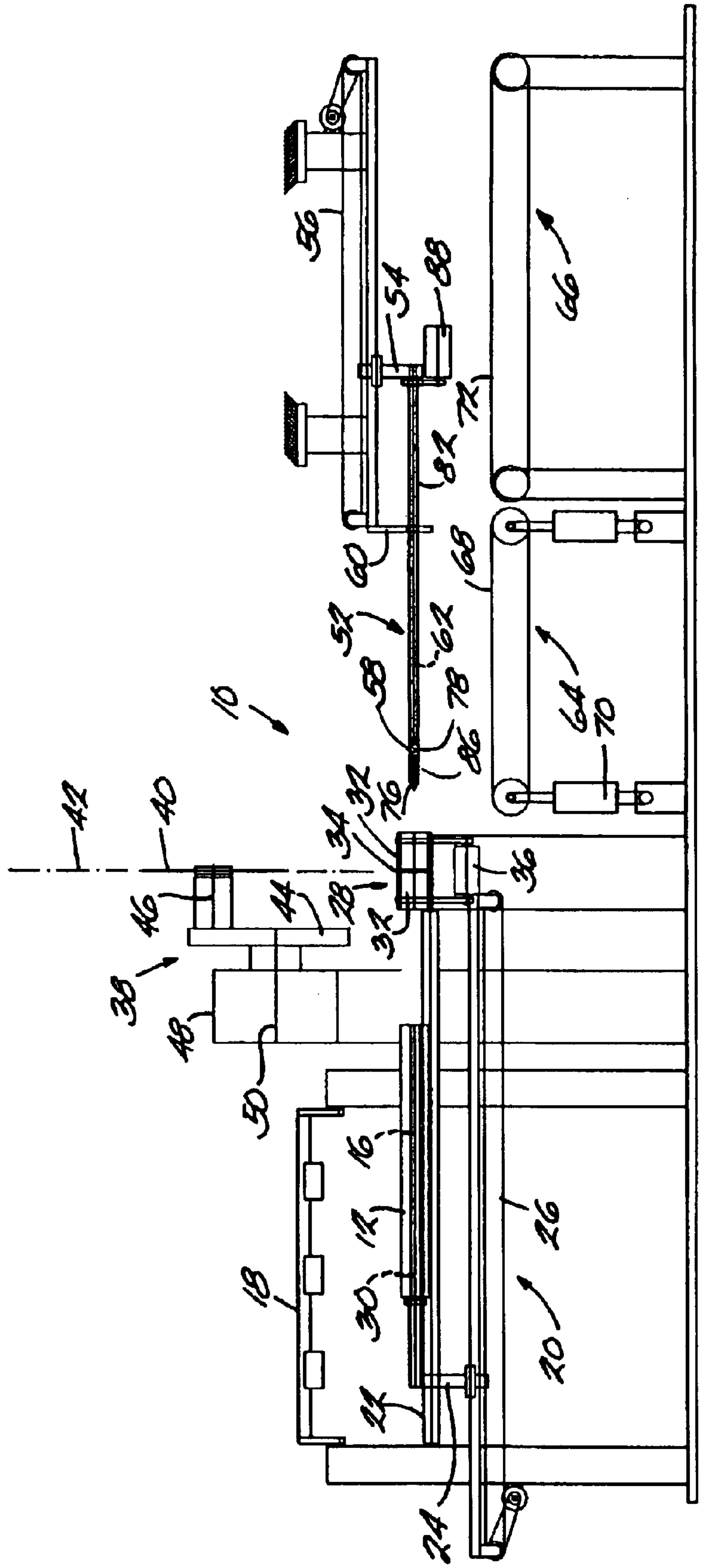

With reference to FIG. 6, the log bucket 18 drops the log 12 into the log indexing conveyor 20, and the pusher 24 moves the log 12 toward the clamp assembly 28. Preferably, the mandrel 52 moves simultaneously toward the clamp assembly 28. The orbital head 44 maintains the saw blade 40 away from the rotating clamp assembly 28.

Figure 7:
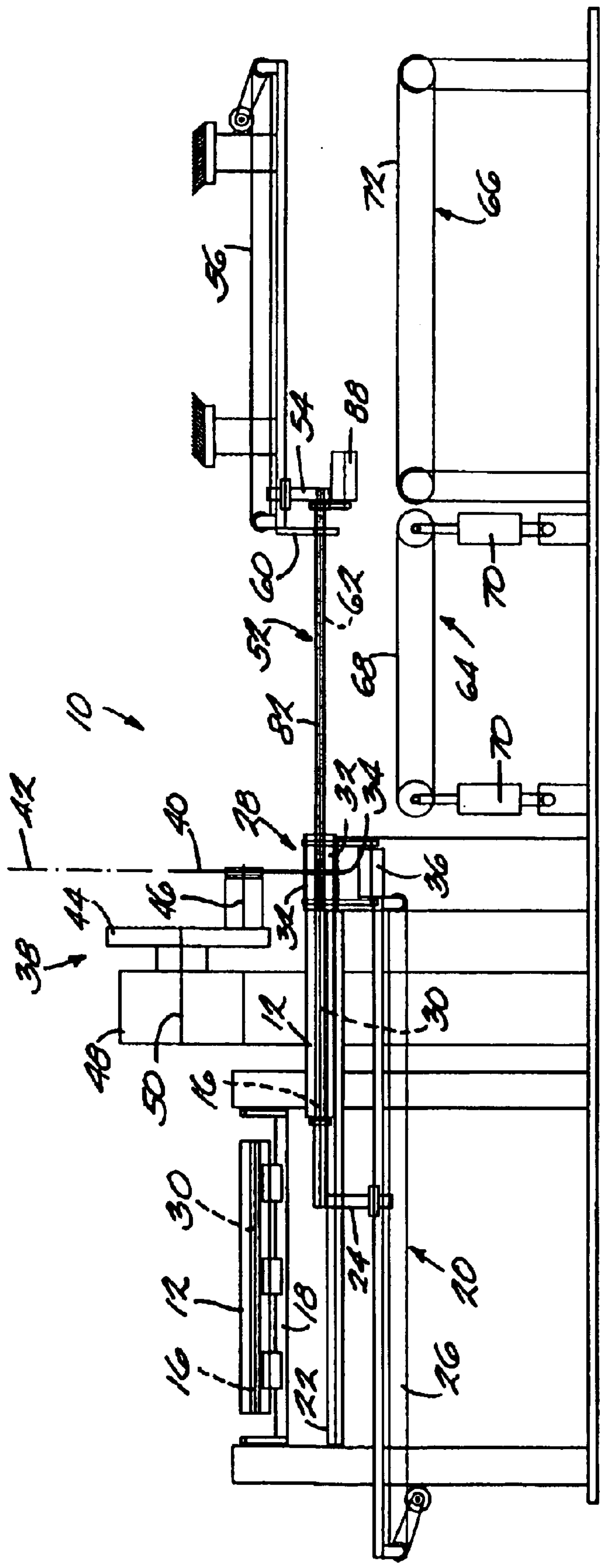

As shown in FIG. 7, the mandrel 52 enters the rotating clamp assembly 28 and aligns the recess 58 with the plane 42 of the saw blade 40 and the gap 34 between the rotating clamps 32. Preferably, the pusher 24 moves the log 12 into the rotating clamp assembly 28, positioning the mandrel 52 within the aperture 16 of the log 12. The motor 36 rotates the clamps 32 and the motor 88 rotates the main sleeve 82 to rotate the main sleeve 82 with the log 12. The orbit head 44 moves the saw blade 40 down through the gap 34 between the clamps 32 and into the recess 58 of the mandrel 52 to cut a roll 14 from the rotating log 12.

With additional reference to FIG. 2, the saw blade 40 preferably remains in the recess 58 as the log 12 is rotated to ensure that the roll 14 is completely cut from the log 12. The portions of the mandrel 52 flanking the recess 58 maintain the integrity of the aperture 16 during the cutting operation. The small amount of paper that might deflect into the recess 58 due to the pressure generated by the saw blade 40 can be reformed to its original position as the log 12 and roll 14 rotate around to the bottom of the non-rotating portion 78 of the mandrel 52 where the recess 58 is not present. By virtue of the configuration of the recess 58, the flanking portions of the mandrel 52 reduces the deflection of the aperture 16 by supporting the aperture 16 on both sides of the saw blade 40 and then by reforming the aperture 16 as the log 12 and roll 14 rotate around the non-rotating portion 78 of the mandrel 52. The use of a non-abrupt transition between the recess 58 and the portion of the mandrel 52 on the opposite side of the mandrel 52 is effective at gently reforming the deflected paper outwardly to the shape of the aperture 16 as the log 12 and roll 14 rotate around the non-rotating portion 78. As an alternative, other types of transitions between the recess 58 and the unrecessed opposite side of the non-rotating portion can be employed to achieve the same results. Also, the transition (preferably non-abrupt) between the recess 58 and the portion of the mandrel 52 flanking the recess 58 can gently reform the deflected paper outwardly to the shape of the aperture 16 when the log 12 and the roll 14 are advanced by the pusher 24 farther up the mandrel 52.

In other embodiments of the present invention such as that shown in FIG. 3, the mandrel 152 (and more specifically, the portions of the mandrel 152 adjacent to the recess 158) does not reform the aperture 16 during rotation of the mandrel 152. Instead, the mandrel 152 reforms the aperture 16 when the pusher 24 moves the log 12 and roll 14 farther onto the mandrel 152. Specifically, the non-abrupt transition 160 between the radially innermost surface of the third portion $P_3$ and the outer surface of the first portion $P_1$ reforms the deflected paper outwardly to the shape of the aperture 16 when the log 12 and the roll 14 are advanced by the pusher 24 farther up the mandrel 152.

After the roll 14 is cut, the orbital head 44 preferably moves the saw blade 40 away from the rotating clamp assembly 28 so that the pusher 24 can move the log 12 and roll 14 toward the mandrel 52 a distance equal to the length of the next roll 14 to be cut, which typically remains consistent for the entire log 12. Eventually, the cut roll 14 is pushed out of the rotating clamp assembly 28 and slides farther onto the mandrel 52. In the illustrated preferred embodiment, the mandrel 52 is secured against axial movement to maintain the recess 58 in alignment with the plane 42 of the saw blade 40.

Figure 8:
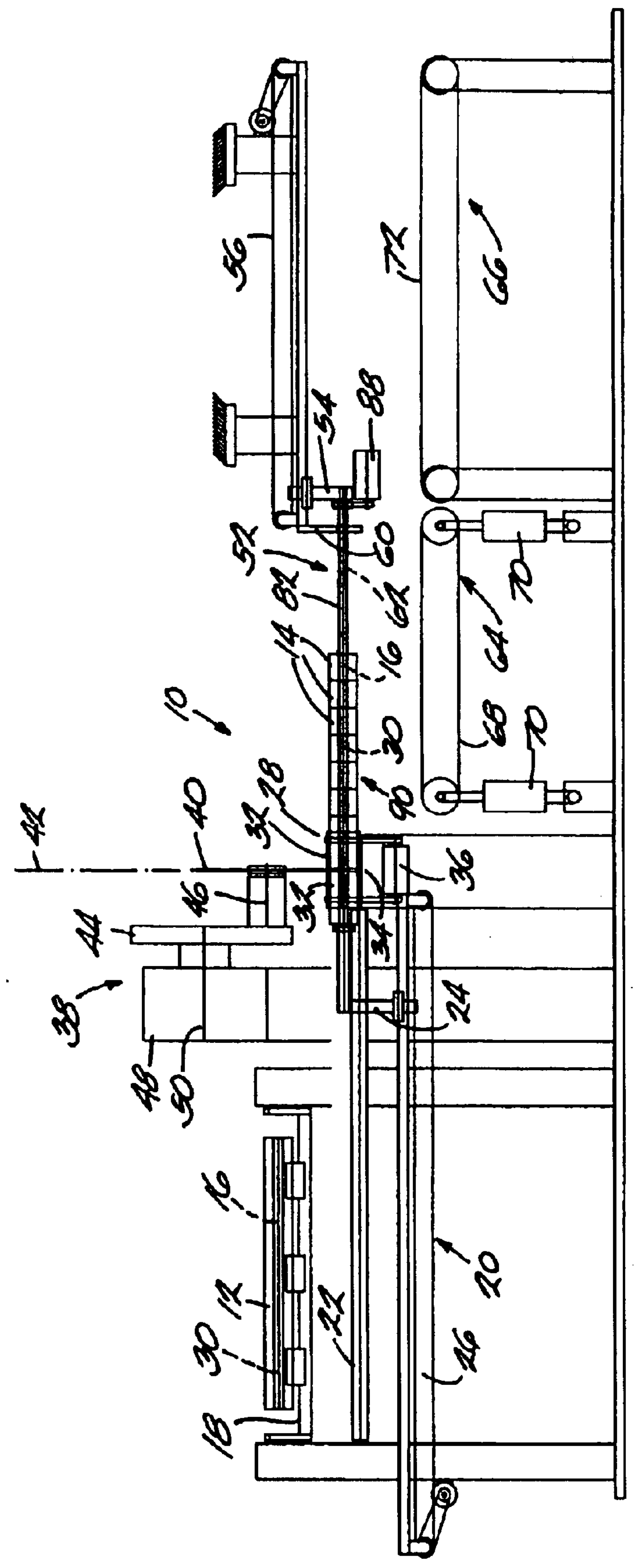
Figure 9:
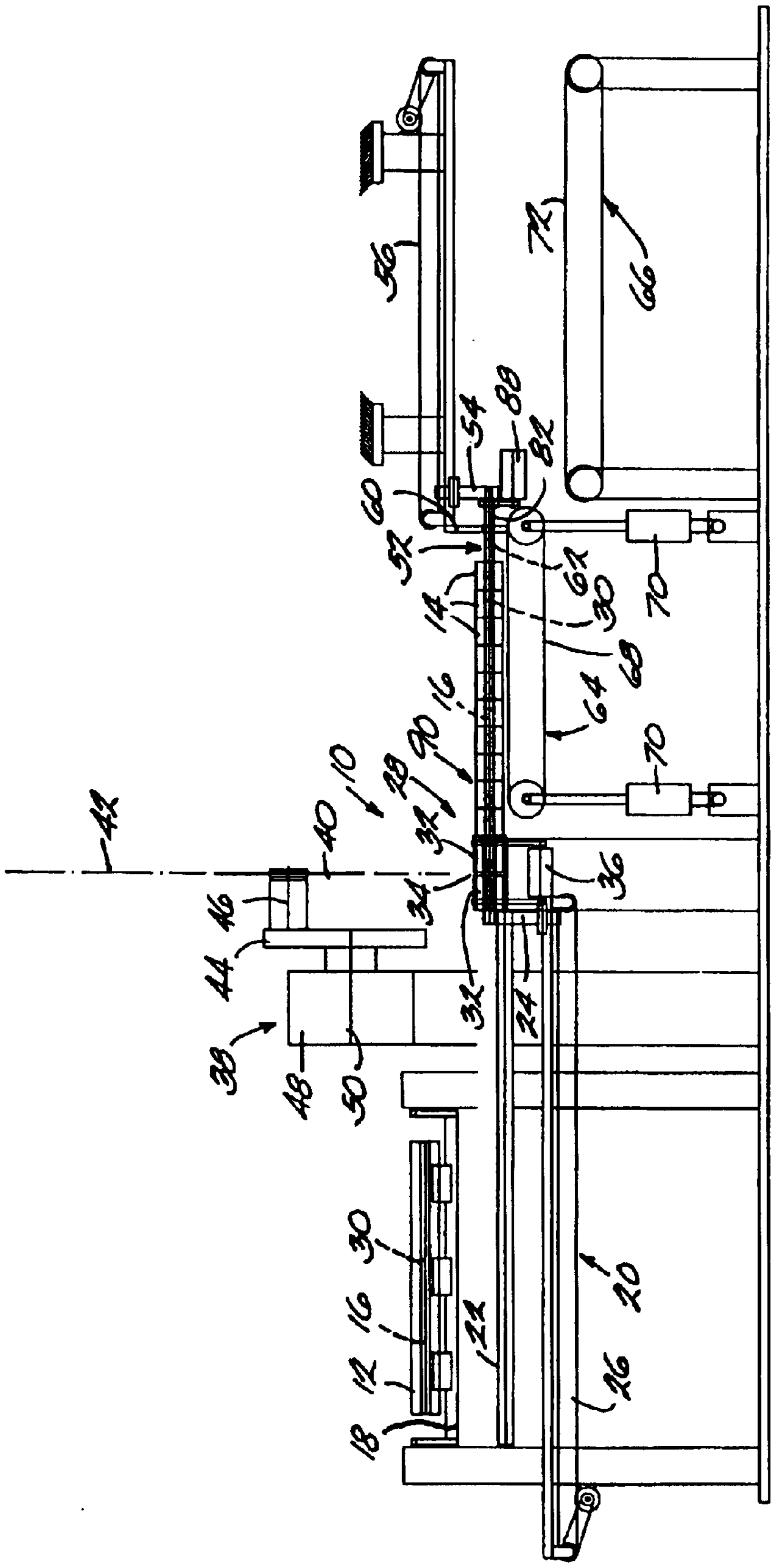

Referring to FIG. 8, the saw assembly 10 has cut most of the log 12 into consumer-sized products Each cut roll 14 is pushed by the pusher 24 to slide farther up the mandrel 52, forming a row 90 of cut rolls 14. After the last roll 14 is cut from the log 12 as shown in FIG. 9, the orbital head 44 preferably moves the saw blade 40 away from the rotating clamp assembly 28. Preferably, the pusher 24 moves the uncut remainder of the log 12 through the rotating clamp assembly 28 and onto the mandrel 52.

Figure 10:
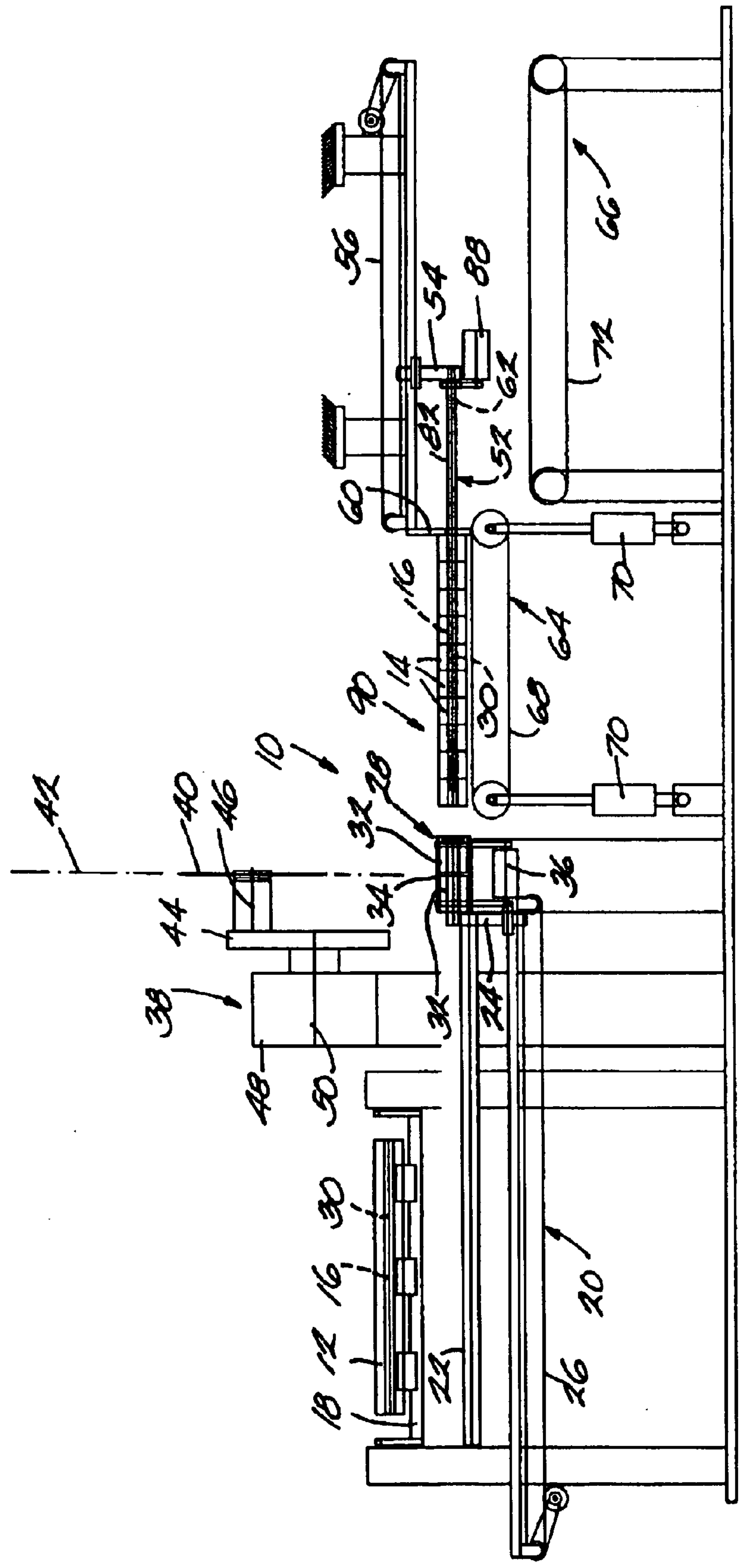
Figure 11:
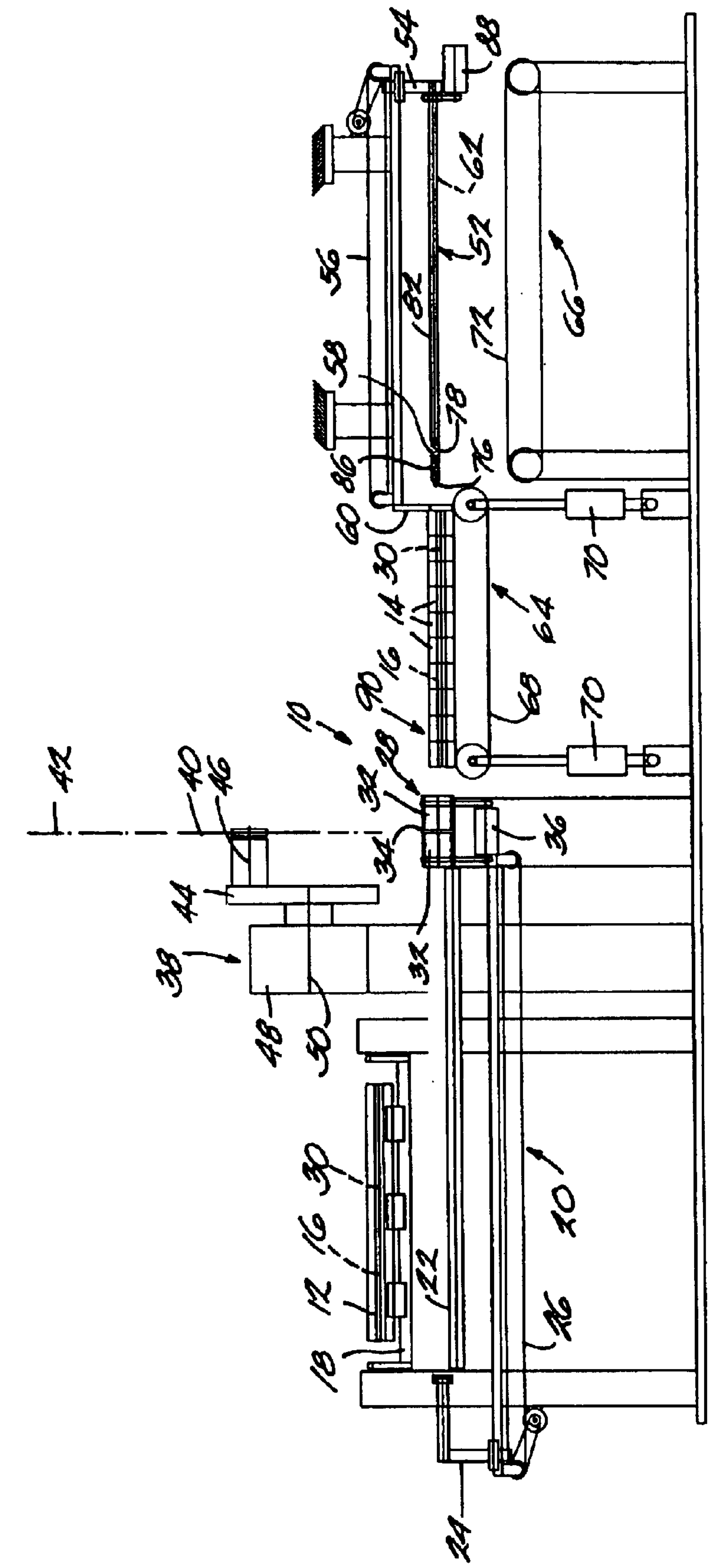

In FIG. 10, the actuators 70 of the movable conveyor 64 raise the belt 68 toward the mandrel 52 to a position adjacent to the cut rolls 14 on the mandrel 52. Preferably, the mandrel conveyor 56 moves the mandrel 52 away from the rotating clamp assembly 28 to cause the first cut roll 14 to contact the stripper plate 60. The stripper plate 60 pushes the rolls 14 off of the mandrel 52 and onto the belt 68 as the mandrel conveyor 56 continues to move the mandrel 52 away from the rotating clamp assembly 28. As shown in FIG. 11, the mandrel 52 moves to completely remove the rolls 14 from the mandrel 52 and the pusher 24 returns to the starting position away from the rotating clamp assembly 28. The cycle is completed when the actuators 70 lower the belt 68 supporting the cut rolls 14 to align the belt 68 with the belt 72 of the product discharge conveyor 66 such that rotation of the belts 68, 72 moves the cut rolls 14 to downstream operations (such as to a packaging machine or equipment).

In another method of using the log saw assembly 10 according to the present invention, a mandrel (such as a winding mandrel (not shown)) similar to the mandrel 52 described above is left within the log 12 and is loaded into the log indexing conveyor 20. In this case, the log 12 and the winding mandrel could be gripped on the end opposite to the rotating clamp assembly 28 such that a recess 58 of the winding mandrel can be aligned with the plane 42 of the saw blade 40. Preferably, the pusher 24 would then index the log 12 into the rotating clamp assembly 28 while the winding mandrel remains stationary to thereby index the cut rolls 14 off of the winding mandrel and onto a conveyor similar to the movable conveyor 64 or the product discharge conveyor 66.

In an additional embodiment of the invention, the mandrel 52 includes multiple recesses 58 and is movable to selectively align each of the multiple recesses 58 with the plane 42 of the saw blade 40. The mandrel 52 could be used in a similar manner to that described above, except that the mandrel 52 would begin positioned within the log 12 and would preferably index with the log 12 to align sequential recesses 58 with the saw blade 40 to cut the next roll 14 from the log 12. Alternatively, the mandrel 52 could be used with a saw 38 that includes multiple saw blades 40 and additional clamp assemblies 28. The saw blades 40 are preferably coupled together and are offset from each other along the saw blade axis 46, and the additional clamp assemblies 28 (rotatable or non-rotatable) are preferably positioned in an end-to-end relationship with the other clamp assemblies 28. Each saw blade 40 will move between a gap 34 between adjacent clamps 32 and into a respective recess 58. In this manner, the pusher 24 could index the log 12 at larger increments because each pass of the saw blades 40 will make more cuts through the log 12.

Accordingly, a mandrel 52 having one or more recesses 58 according to the present invention can be stationary to receive moving rolled product pushed thereon, can be movable to be inserted within rolled product that is simultaneously moved with respect to the mandrel 52, or can be movable to be inserted within stationary or substantially stationary rolled product. In the case where both the mandrel 52 and the rolled product are movable, the mandrel and rolled product can be moved in stages, simultaneously, or in any other manner desired. In any case, rolled product is preferably cut as described above as it is placed upon the mandrel 52 as it is removed from the mandrel 52, or between these operations.

The embodiments described above and illustrated in the drawings are presented by way of example only and are not intended as a limitation upon the concepts and principles of the present invention. As such, it will be appreciated by one having ordinary skill in the art, that various changes in the elements and their configuration and arrangement are possible without departing from the spirit and scope of the present invention as set forth in the appended claims.

I claim:

1. A saw assembly for cutting a rotating log into rolls, the saw assembly comprising:

a mandrel positionable to at least partially support the rotating log, the mandrel including a longitudinal axis, a first portion including a radially outermost surface defining a first radial distance from the longitudinal axis, and a second portion including a radially outermost surface defining a second radial distance from the longitudinal axis; and a saw blade movable toward the longitudinal axis to a cutting position between the first portion and the second portion, the cutting position defining a third radial distance between the saw blade and the longitudinal axis, the third radial distance being shorter than each of the first and second radial distances, wherein the mandrel includes a third portion connecting the first and second portions, the third portion including a radially innermost surface defining a fourth radial distance from the longitudinal axis, the fourth radial distance being shorter than each of the first, second, and third radial distances, and wherein the mandrel includes a sloped wall between the radially innermost surface of the third portion and the radially outermost surface of the first portion.

2. The saw assembly of claim 1, wherein the first and second radial distances are substantially the same.

3. The saw assembly of claim 1, further comprising:

a log saw clamp adapted to rotate the log, the log saw clamp at least partially surrounding at least one of the first portion and the second portion.

4. The saw assembly of claim 1, wherein the mandrel is rotatable.

5. The saw assembly of claim 1, wherein the radially innermost surface of the third portion is connected to the radially outermost surface of the first portion by the sloped wall defining an acute included angle with respect to the longitudinal axis.

6. The saw assembly of claim 1, wherein the mandrel is non-rotatable.

7. The saw assembly of claim 1, wherein the third portion is non-rotatable.

8. The saw assembly of claim 7, wherein the second portion is rotatable.

9. A method for cutting a rotating log into rolls, the method comprising:

providing a mandrel including a longitudinal axis, a first portion including a radially outermost surface defining a first radial distance from the longitudinal axis, and a second portion including a radially outermost surface defining a second radial distance from the longitudinal axis;

at least partially supporting the log with the mandrel received within an aperture of the log;

rotating the log;

moving the saw blade toward the longitudinal axis to a cutting position between the first portion and the second portion, the cutting position defining a third radial distance between the saw blade and the longitudinal axis, the third radial distance being shorter than each of the first and second radial distances, wherein the mandrel has a third portion connecting the first and second portions, the third portion including a radially innermost surface defining a fourth radial distance from the longitudinal axis, the fourth radial distance being shorter than the each of the first, second, and third radial distances, and wherein the mandrel includes a sloped wall between the radially innermost surface of the third portion and the radially outermost surface of the first portion;

cutting at least one roll from the log as the saw blade moves to the cutting position, the at least one roll including an aperture;

moving the at least one roll along the mandrel in the longitudinal direction; and reforming the aperture of the roll with the sloped wall as the roll is moved in the longitudinal direction.

10. The method of claim 9, further comprising clamping the log within a log saw clamp, wherein rotating the log includes rotating the log saw clamp and the log.

11. The method of claim 9, further comprising rotating the mandrel.

12. The method of claim 9, further comprising securing the mandrel against rotation.

13. The method of claim 9, further comprising securing the third portion of the mandrel against rotation, and rotating the first portion of the mandrel with the log.

14. The method of claim 13, further comprising rotating the second portion of the mandrel with the log.

15. A saw assembly for cutting a rotating log into rolls, the log and the rolls each having a centrally located, longitudinally extending aperture, the saw assembly comprising:

a movable saw blade;

a mandrel adapted to be received within the aperture of the log, the mandrel including a non-rotating portion having a recess opening in one direction and an unrecessed part opposite to the recess, the saw blade movable from a first position in which the saw blade is located outside of the recess in the mandrel to a second position in which the saw blade is located within the recess, wherein the non-rotating portion includes a non-abrupt circumferential transition between the recess and the unrecessed part of the non-rotating portion, and wherein the mandrel includes a sloped wall between the recess and an outer surface of the mandrel flanking the recess.

16. The saw assembly of claim 15, further comprising a log saw clamp adapted to rotate the log, the log saw clamp at least partially surrounding a portion of the mandrel.

17. The saw assembly of claim 15, wherein the mandrel is non-rotatable.

18. The saw assembly of claim 17, wherein the recess extends partially around the mandrel, the recess opening toward the saw blade.

19. The saw assembly of claim 15, wherein the mandrel includes at least one rotatable portion adjacent to the non-rotating portion.

20. The saw assembly of claim 19, wherein the non-rotatable portion is located on a shaft and the rotatable portion includes a sleeve rotatably coupled to the shaft.

21. The saw assembly of claim 19, wherein the mandrel includes an additional rotatable portion on a side of the non-rotatable portion opposite to the rotatable portion.

22. A method for cutting a rotating log into rolls, the method comprising:

receiving a mandrel within a centrally located, longitudinally extending aperture in the log;

rotating the log;

moving a saw into and within a recess of a non-rotating part of the mandrel;

cutting at least one roll from the log as the saw blade moves to the cutting position, the at least one roll including an aperture;

rotating the at least one roll about the mandrel;

reforming the aperture of the roll with a non-abrupt circumferential transition between the recess and an unrecessed part of the non-rotating portion as the roll rotates about the mandrel;

moving the at least one roll along the mandrel in the longitudinal direction; and reforming the aperture of the roll with a sloped wall between the recess and an outer surface of the mandrel flanking the recess as the roll is moved in the longitudinal direction.

23. The method of claim 22, further comprising clamping the log within a log saw clamp, wherein rotating the log includes rotating the log saw clamp and the log.

24. The method of claim 22, further comprising securing the mandrel against rotation.

25. The method of claim 22, further comprising rotating a rotatable portion of the mandrel with the log, the rotatable portion being adjacent to the non-rotatable portion.

26. The method of claim 25, further comprising rotating an additional rotatable portion of the mandrel with the log, the additional rotatable portion being on a side of the non-rotatable portion opposite to the rotatable portion.

27. A log saw mandrel for use with a log saw having a log saw blade, the log saw mandrel comprising:

an elongated body having a first end, a second end opposite the first end, and an outer surface extending between the first and second ends;

a recess defined in the elongated body between the first and second ends of the elongated body, the recess extending partially through the elongated body and shaped to receive at least part of the blade of the log saw beneath the outer surface of the elongated body; and a sloped wall between the recess and an outer surface of the elongated body flanking the recess.

28. A method of cutting a log of wound product, comprising:

receiving at least part of the log upon a mandrel;

cutting at least one roll from the log with a log saw blade at a location along the mandrel, the at least one roll including an aperture; and receiving at least part of the log saw blade within a recess in the mandrel;

moving the at least one roll along the mandrel in a longitudinal direction; and reforming the aperture of the roll with a sloped wall between the recess and an outer surface of the mandrel flanking the recess as the roll is moved in the longitudinal direction.

* * * * *